United States Patent
Won (10) Patent No.: US 10,723,330 B2
(45) Date of Patent: Jul. 28, 2020

(54) SUPPORT BRAKING APPARATUS AND METHOD FOR VEHICLE

(71) Applicant: MANDO CORPORATION, Gyeonggi-do (KR)

(72) Inventor: Gi Yeon Won, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/717,908

(22) Filed: Sep. 27, 2017

(65) Prior Publication Data
US 2018/0099648 A1    Apr. 12, 2018

(30) Foreign Application Priority Data
Oct. 7, 2016    (KR) .......................... 10-2016-0129605

(51) Int. Cl.
*B60T 7/22*    (2006.01)
*B60T 8/00*    (2006.01)
(Continued)

(52) U.S. Cl.
CPC .................. *B60T 7/22* (2013.01); *B60T 8/00* (2013.01); *B60T 8/171* (2013.01); *B60T 8/172* (2013.01);
(Continued)

(58) Field of Classification Search
USPC ......................................................... 701/70
See application file for complete search history.

(56) References Cited

U.S. PATENT DOCUMENTS

| 8,676,431 B1 * | 3/2014 | Mariet ................. G05D 1/0238 701/28 |
| 2013/0110368 A1 * | 5/2013 | Zagorski ................... B60T 7/22 701/70 |

(Continued)

FOREIGN PATENT DOCUMENTS

KR       10-1414571       8/2014

*Primary Examiner* — Lail A Kleinman
*Assistant Examiner* — Mahmoud M Kazimi
(74) *Attorney, Agent, or Firm* — Ladas & Parry, LLP (57) ABSTRACT

The present disclosure relates to a support braking apparatus and method for a vehicle capable of detecting braking target candidates for a vehicle, matching a braking amount required for the detected braking target candidates with a braking amount of a driver to select a specific braking target, and braking a subject vehicle by following up braking required for the selected braking target even if the driver does not maintain a braking control for the selected braking target. A support braking apparatus for a vehicle according to an embodiment of the present disclosure includes: a braking amount measurer configured to measure a first braking amount based on signals input from an acceleration sensor and a wheel sensor; a braking target detector configured to detect braking target candidates on a driving route by a camera and a radar; a braking target selector configured to match a first braking amount with a second braking amount to stop a subject vehicle within a braking range for the braking target candidates to select the braking target, and a braking controller configured to control an automatic braking to stop the subject vehicle within the braking range for the selected braking target.

11 Claims, 4 Drawing Sheets

(51) Int. Cl.
*B60T 8/32* (2006.01)
*B60T 8/172* (2006.01)
*B60T 8/171* (2006.01)

(52) U.S. Cl.
CPC ....... *B60T 8/3205* (2013.01); *B60T 2201/022* (2013.01); *B60T 2210/10* (2013.01); *B60T 2220/04* (2013.01)

(56) References Cited

U.S. PATENT DOCUMENTS

2014/0063248 A1* 3/2014 Sakagami .............. G08B 13/22
  348/148
2017/0327094 A1* 11/2017 Inoue .................... B62D 15/02

* cited by examiner

SUPPORT BRAKING APPARATUS AND METHOD FOR VEHICLE

CROSS-REFERENCE(S) TO RELATED APPLICATIONS

This application claims priority to Korean Patent Application No. 10-2016-0129605, filed on Oct. 7, 2016, the disclosure of which is incorporated herein by reference in its (their) entirety.

BACKGROUND OF THE INVENTION

Field of the Invention

Exemplary embodiments of the present disclosure relate to a support braking apparatus for a vehicle, and more specifically, to a support braking apparatus and method for a vehicle capable of detecting braking target candidates for a vehicle, matching a braking amount required for the detected braking target candidates with a braking amount of a driver to select a specific braking target, and braking a subject vehicle by following up braking required for the selected braking target even if the driver does not maintain a braking control for the selected braking target.

Description of the Related Art

As various functions for a vehicle are improved, various techniques have been introduced to improve stability and convenience of a driver and passengers of a vehicle.

Among these, autonomous emergency braking (hereinafter, AEB) acts to positively intervene in a collision anticipation situation to operate a brake, thereby preventing accidents or minimizing the damage, unlike a frontal collision warning system acting to provide 'notification' to a driver.

However, the existing automatic emergency braking system may have difficulty in selecting a control target that exactly coincides with a driving route of a driver at a specific distance or more and recognize targets at slightly different positions from the actual driving route of the driver as a deceleration control target. The automatic emergency braking system erroneously selects the control target during the high-speed driving to perform an automatic deceleration itself. In addition, there is a problem that the automatic emergency braking system cannot be utilized when there are no vehicles on a driving route at an intersection or during a stop signal.

RELATED ART DOCUMENT

Patent Document

Korean Patent No 10-1414571 (Apparatus of preventing collision in vehicle, control method thereof)

SUMMARY OF THE INVENTION

An object of the present disclosure is to provide a support braking apparatus and method for a vehicle capable of considering road conditions on a driving route or the like as well as a vehicle, a bicycle, a pedestrian as braking targets of a vehicle, matching a braking amount of a driver with an target braking a vehicle that the driver recognizes among a plurality of braking targets detected by a camera and a radar to select a braking target, and automatically maintaining the braking even if the braking of the driver is not maintained.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a support braking apparatus for a vehicle includes: a braking amount measurer configured to measure a first braking amount based on signals input from an acceleration sensor and a wheel sensor; a braking target detector configured to detect at least one braking target candidates on a driving route by a camera and a radar; a braking target selector configured to calculate a second braking amount so that a subject vehicle is stopped within a braking range for each of the at least one braking target candidates, and match a second braking amount for each of the at least one braking target candidates with the first braking amount to select a braking target; and a braking controller configured to perform automatic braking to stop the subject vehicle within the braking range for the selected braking target.

The braking target detector may divide an intersection or a stop signal as a first braking target candidate, a case in which braking is required according to a lane change or road surface marking as second braking target candidate, obstacles on a driving route as a third braking target candidate, and obstacles on a side of the driving route as a fourth braking target candidate and detect the first, second, third, and fourth braking target candidates.

The braking target selector may include: a braking amount calculator configured to calculate a second braking amount so that the subject vehicle is stopped within the braking range for each of the at least one braking target candidates based on a distance and a relative speed between each of the at least one braking target candidates and the subject vehicle; and a braking amount comparator configured to match the first braking amount with the second braking amount for each of the at least one braking target candidates to compare the first braking amount with the second braking amount.

The braking controller may apply the first braking amount to brake the subject vehicle if a braking control by the driver is maintained.

The braking controller may apply the second braking amount to the selected braking target to perform an automatic control to brake the subject vehicle within the braking range for the selected braking target if the braking control by the driver is not maintained.

The braking controller may release the performed automatic control if the braking control by the driver is operated again.

In accordance with one aspect of the present disclosure a support braking method for a vehicle includes: selecting a braking target matching an original braking amount among at least one braking target candidates when the original braking amount is input; and performing automatic braking to stop a subject vehicle within a braking range for the selected braking target even if a braking control by a driver is not maintained.

The selecting of the braking target may include: measuring a first braking amount based on signals input from an acceleration sensor and a wheel sensor; detecting the at least one braking target candidates on a driving route; calculating a second braking amount for each of the at least one braking target candidates so that the subject vehicle is stopped within the braking range based on a distance and a relative speed between each of the at least one braking target candidates and the subject vehicle; and matching the first braking amount with the second braking amount for each of the at least one braking target candidates to select a specific braking target.

The performing of the automatic control may include applying the first braking amount to brake the subject vehicle if a braking control by the driver is maintained.

The performing of the automatic control may include applying the second braking amount to brake the subject vehicle within the braking range for the selected braking target if the braking control by the driver is not maintained.

The performing of the automatic control may further include releasing the automatic control if the braking control by the driver is operated again.

In addition, other features and advantages of the present disclosure may be newly understood through the embodiments of the present disclosure.

The support braking apparatus and method for a vehicle according to the embodiment of the present disclosure can enlarge and select the braking control target in consideration of the situations in which the braking is required while the vehicle is driving and clarify the specific braking target that the driver targets on the driving route among the plurality of braking targets.

In addition, if the braking is interrupted by the driver, the braking force can be maintained and the risk of accident can be reduced.

The effects that may be achieved by the embodiments of the present disclosure are not limited to the above-mentioned objects. That is, other effects that are not mentioned may be obviously understood by those skilled in the art to which the present disclosure pertains from the following description.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, exemplary embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

For the sake of clarity, parts that are not related to the essence of the present disclosure may be omitted from the detailed description, and the same or similar elements may be given the same reference numerals throughout the specification.

In addition, unless explicitly described to the contrary, "comprising" any components will be understood to imply the inclusion of other elements rather than the exclusion of any other elements. Terminologies used herein are to mention only a specific exemplary embodiment, and do not limit the present disclosure, and may be interpreted as a concept understood by a person having ordinary skill in the art to which the present disclosure pertains unless otherwise defined herein.

Figure 1:
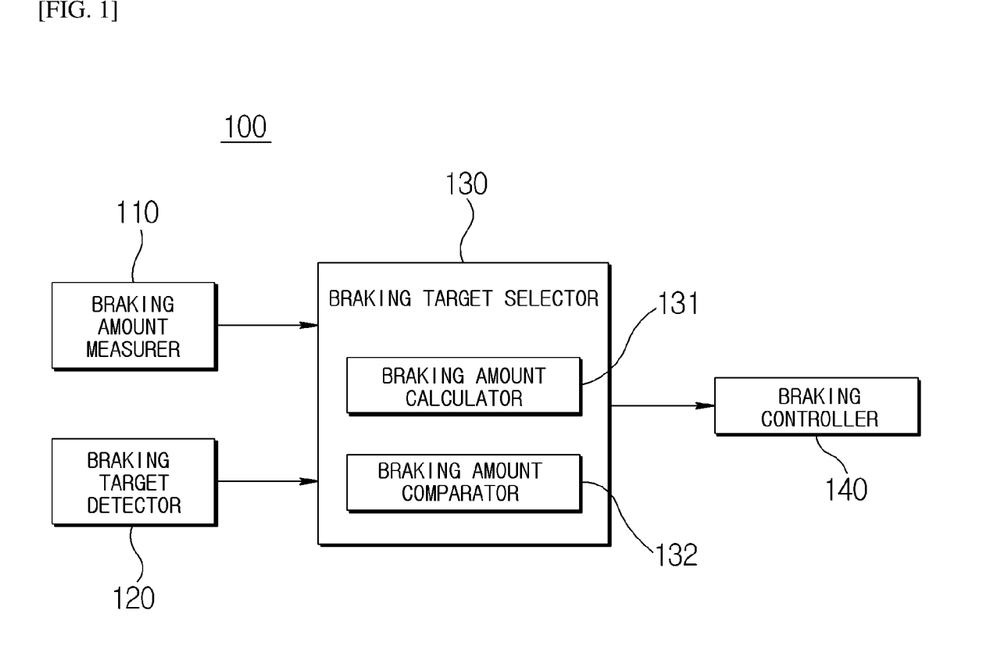
FIG. 1 is a diagram illustrating a support braking apparatus for a vehicle according to an embodiment of the present disclosure.

FIG. 1 is a view showing a support braking apparatus for a vehicle according to an embodiment of the present disclosure.

Referring to FIG. 1, a support braking apparatus 100 for a vehicle according to an embodiment of the present disclosure includes a braking amount measurer 110, a braking target detector 120, a braking target selector 130, a braking amount calculator 131, a braking amount comparator 132, and a braking controller 140.

The braking amount measurer 110 measures a first braking amount by a driver from an acceleration sensor and a wheel sensor. The driver performs braking according to road conditions such as when recognizing an object such as a forward vehicle, a pedestrian, a bicycle, etc., on a driving route while driving and when an intersection, a stop signal, or a lane change is required. The driver performing braking by changing a braking distance, a braking time, and a deceleration depending on a distance between a vehicle and a braking target and a vehicle speed. The braking amount measurer 110 measures the first braking amount through the acceleration sensor and the wheel sensor and transmits the measured first braking amount to the braking target selector 130.

The braking target detector 120 detects braking target candidates on the driving route by using a camera and a radar. The braking target detector 120 may detect a vehicle, a pedestrian, or the like by the radar and may detect obstacles such as a vehicle, a pedestrian, a bicycle, a traffic signal, road surface marking, and a box on a road, animals, a guard rail on the driving route, a chin between a sidewalk and a road, or the like by the camera.

Figure 2:
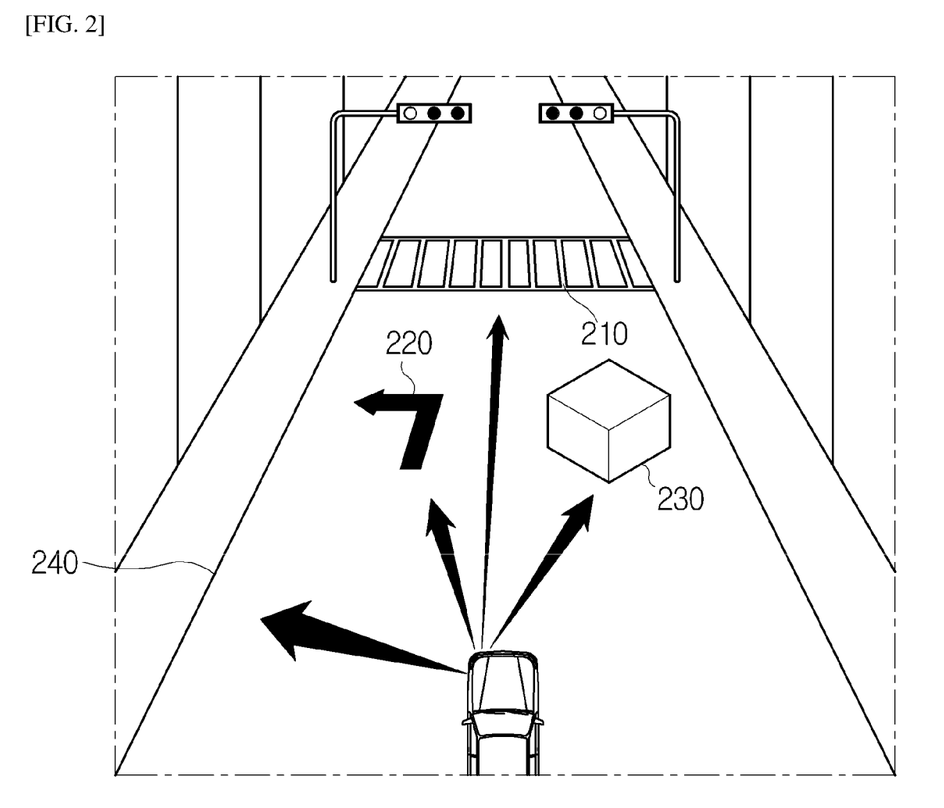
FIG. 2 is a diagram illustrating an example in which a braking target detector 120 detects braking target candidates on a driving route.

FIG. 2 is a diagram illustrating an example in which a braking target detector 120 detects braking target candidates on a driving route.

Referring to FIG. 2, an object or a situation to be braked may be detected by being divided into a case in which braking is required due to an intersection or a stop signal as a first braking target candidate 210, a case in which braking is required according to a situation where a vehicle enters a lane different from a destination direction to require a lane change or road surface marking such as a U-turn and a left turn as a second braking target candidate 220, a case in which braking is required due to animals or a box falling on a road as well as a vehicle, a pedestrian, and a bicycle on a driving route as a third braking target candidate 230, and a case in which braking is required due to obstacles in a lateral direction while curve driving or obstacles (for example, the guard rails on the sides of the driving route or the chin between the sidewalk and the road) on sides of the driving route as a fourth braking target candidate 240.

The braking target detector 120 may more accurately detect the target detected by the camera and the radar in a sensor fusion manner and transmit the detected braking target candidates to the braking target selector 130.

The braking target selector 130 matches the first braking amount with a second braking amount so that the vehicle is stopped within a braking range for the braking target candidates to select the braking target. The braking range refers to an area in which the subject vehicle may be stopped without collision between the braking target and the subject vehicle. The braking range is a risk of collision if a stopping distance approaches the braking target, and a traffic flow may be interrupted if the stopping distance is too long. Therefore, the braking range may be set in consideration of a road surface condition or the like. For example, the second braking amount may be calculated by setting the braking range so that the vehicle is stopped within a distance from the braking target of 2 to 3 meters. The braking target selector 130 includes a braking amount calculator 131 and a braking amount comparator 132.

The braking amount calculator 131 calculates the second braking amount such as a braking distance, a braking time, and a deceleration based on the distance between the braking targets and the subject vehicle and the speed of the subject vehicle that are detected by the braking target detector 120 so that the subject vehicle is stopped within the braking range for the braking target candidates when the vehicle is braked.

The braking amount comparator 132 matches the first braking amount measured by the braking amount measurer 110 and the second braking amount calculated by the braking amount calculator 131 to compare them. That is, the first braking amount measured by the braking amount measurer 110 and the second braking amount of the vehicle calculated by the braking amount calculator 131 are matched with each other to select the braking target at which the driver targets among the plurality of braking targets detected by the braking target detector 120.

Figure 3:
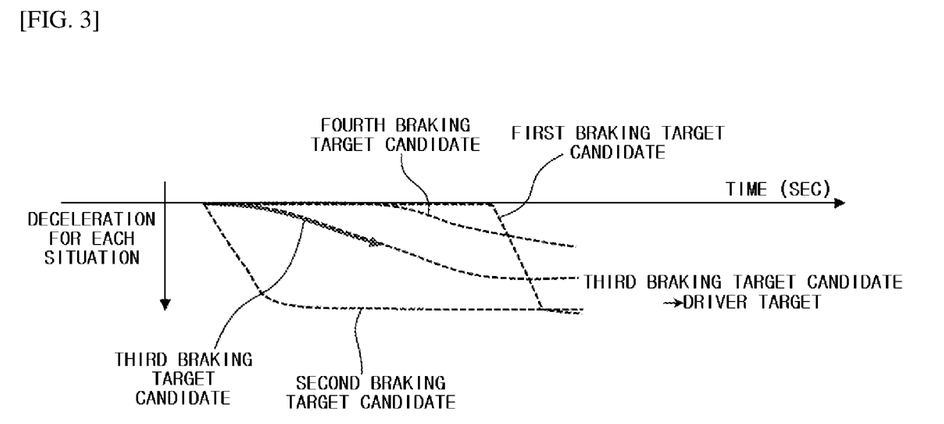
FIG. 3 is a diagram illustrating matching a braking amount required for braking target candidates with a braking amount of the driver to select a braking target that a driver targets.

FIG. 3 is a diagram illustrating that a braking target selector matches a braking amount required for braking target candidates with a braking amount of the driver to select a braking target that a driver targets.

As illustrated in FIG. 3, for example, if the braking target detector 120 detects an intersection as the first braking target candidate positioned at 40 meters ahead of the subject vehicle, detects U-turn marking on a road surface of a driving route as the second braking target candidate positioned at 5 meter ahead of the subject vehicle, detects a box falling on a road as the third target candidate positioned at 30 meters ahead of the subject vehicle, and detects a guard rail as the fourth braking target candidate positioned on a side on the driving route of the subject vehicle, the braking amount calculator 131 calculates the second braking amount for the first braking target candidate stopped within 2 to 3 meters ahead of the intersection set as the braking range by performing a braking control to do a fast deceleration at a point about 5 meters away from the intersection when the braking is required due to the intersection as the first braking target candidate. When the braking is required by the U-turn marking on the road surface of the driving route as the second braking target candidate, that is, when the braking is required for the driver to do the U-turn, the braking amount calculator calculates the second braking amount as the second braking target candidate stopped within about 2 to 3 meters ahead of the U-turn point set as the braking range by performing the braking control to do a fast deceleration at the detected moment. When the braking is required due to the box falling on the driving route as the third braking target candidate, the braking amount calculator calculates the second braking amount for the third braking target stopped within about 2 to 3 meters ahead of the box set as the braking range by performing the braking control to do a slow deceleration from the point where the box is recognized. When the braking is required due to the guard rail as the fourth braking target candidate positioned on the side of the driving route of the subject vehicle, the braking amount calculator calculates the second braking amount as the fourth braking target candidate stopping within about 2 to 3 meters ahead of the guard rail set as the braking range by performing the braking control to do the slow deceleration as the vehicle approaches the guard rail. In one embodiment, when the braking target that the driver targets is the box, the driver starts braking to perform a slow deceleration at a point about 30 meters away from the box and performs a control to stop the vehicle within a 2 to 3 meters ahead of the box. The braking amount measurer 110 measures the first braking amount to be braked by the driver based on the braking distance, the braking time, the deceleration and the like and transmits the measured first braking amount to the braking target selector 130. The braking amount comparator 132 of the braking target selector 130 matches the first braking amount received from the braking amount measurer 110 with each of the second braking amount for the first braking target candidate, the second braking amount for the second braking target candidate, the second braking amount for the third braking target, and the second braking amount for the fourth braking candidate that are calculated by the braking amount calculator 131 to compare them, and as the comparison result, matches the first braking amount with the second braking amount for the third braking target to determine the braking target that the driver targets as the box on the road.

The braking controller 140 performs a control to stop the vehicle within the braking range for the braking target selected by the braking target selector 130. When the driver maintains the braking control for the selected braking target, the braking controller 140 applies the first braking amount measured by the braking amount measurer 110 to brake the subject vehicle. That is, if the braking of the driver is maintained, the braking by the support braking apparatus 100 for a vehicle is released and an override function operated as a manual control by the driver is performed.

When the braking control by the driver is not maintained for the selected braking target, the second braking amount calculated by the braking amount calculator 131 is applied to brake the subject vehicle within the braking range for the selected braking target. That is, when there is no manual control by the driver, the braking controller 140 automatically performs the braking control based on the second braking amount.

In addition, if the driver performs the manual control again during the automatic braking control, the braking controller 140 releases the automatic braking control function and is operated as the manual control by the driver. When the driver steps on an accelerator pedal or a deceleration pedal, it may be determined that the driver starts the manual control. That is, if the driver steps on the accelerator pedal, the vehicle may be operated according to the driver's intention as soon as the current automatic braking control function is released. In addition, when the driver steps on the deceleration pedal, the current automatic braking control function is reset and a new automatic braking control function is started, so that the braking target that the driver targets may be selected newly.

For example, when the box on the road is selected as the braking target, the braking is controlled manually by the driver if the driver maintains the braking. Next, if the driver does not perform the manual control during the braking, the braking controller 140 automatically controls the subject vehicle based on the second braking amount calculated by the braking amount calculator 131. In addition, if the driver performs the manual control again during the automatic control of the subject vehicle based on the second braking amount, the braking controller 140 releases the automatic braking control function and is operated as the manual control by the driver.

Figure 4:
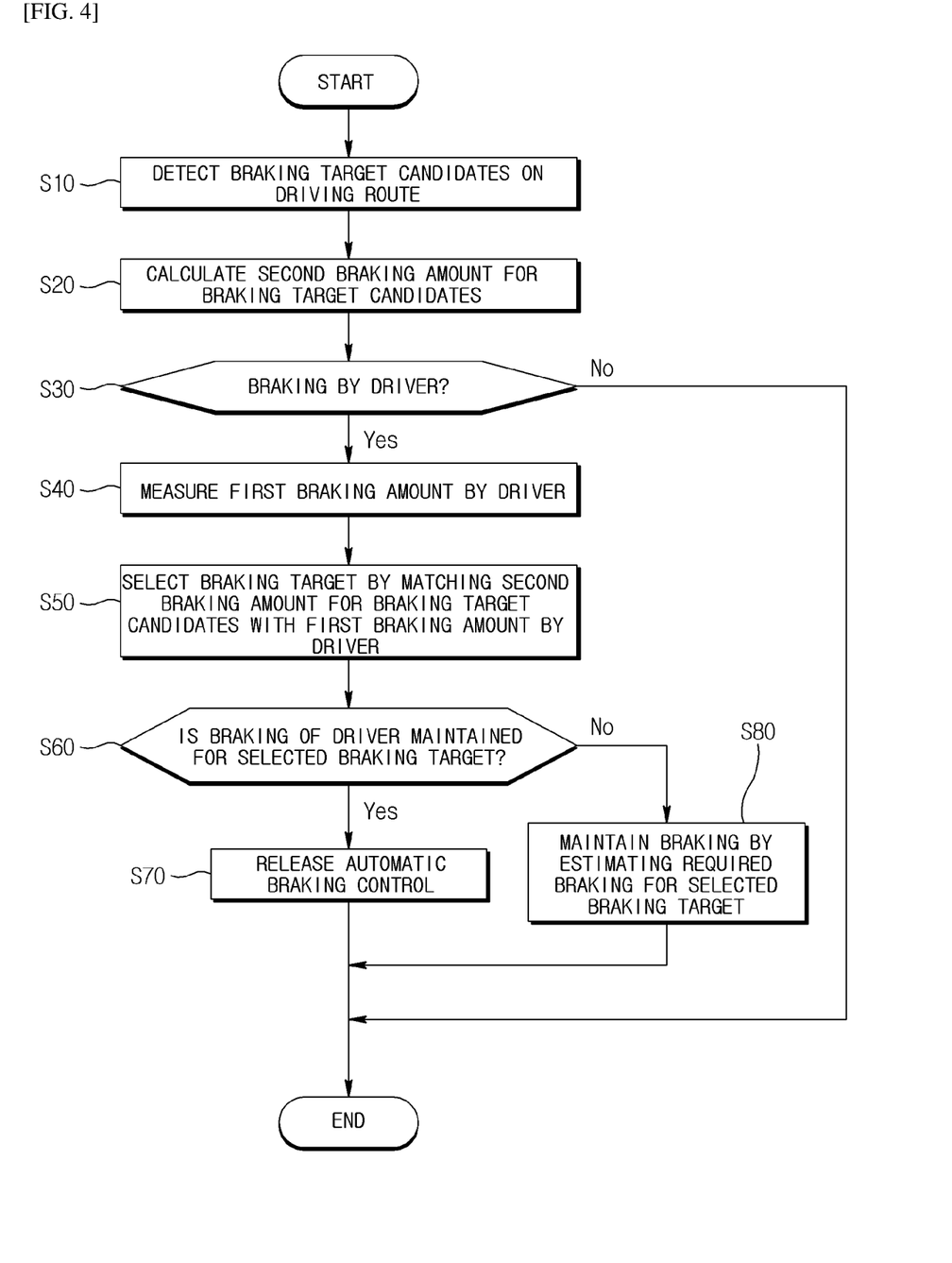
FIG. 4 is a view showing a support braking method for a vehicle according to an embodiment of the present disclosure.

FIG. 4 is a view showing a support braking method for a vehicle according to an embodiment of the present disclosure.

First, the braking target detector 120 detects the braking target candidates on the driving route by using a camera and a radar (S10).

The braking amount calculator 131 of the braking target selector 130 calculates the second braking amount for the braking target candidates (S20). Specifically, the braking amount calculator 131 calculates the second braking amount such as the braking distance, the braking time, and the deceleration based on the distance between the braking targets and the subject vehicle and the speed of the subject vehicle that are detected by the braking target detector 120 so that the subject vehicle is stopped within the distance of the braking range from the braking target candidates when the vehicle is braked.

The support braking apparatus 100 for a vehicle targets any one of the braking targets detected by the braking amount measurer 110 as the braking target to determine whether the driver performs the braking (S30).

When the driver performs braking, the braking amount measurer 110 measures the first braking amount based on the signals input from the acceleration sensor and the wheel sensor (S40). The braking amount measurer 110 measures the first braking amount such as the braking distance, the braking time, and the deceleration depending on the distance between the vehicle and the braking target and the vehicle speed.

The braking target selector 130 selects a braking target that matches the braking amount of the driver among the braking target candidates (S50). Specifically, the braking amount comparator 132 of the braking target selector 130 matches the first braking amount measured by the braking amount measurer 110 and the second braking amount calculated by the braking amount calculator 131 to compare them. As the comparison result, the braking target having the matched braking amount is selected as the braking target that the driver targets among the plurality of braking targets.

The braking controller 140 determines whether the braking by the driver is maintained for the selected braking target (S60).

As the determination result, if the braking of the driver is maintained for the selected braking target, the braking controller 140 performs the override function of automatically releasing the braking by the support braking apparatus 100 for a vehicle (S70).

As the determination result, if it is determined that the braking of the driver is not maintained for the selected braking target, the braking controller 140 performs a control to perform the braking within the braking range for the selected braking target based on the second braking amount for the selected target calculated by the braking amount calculator 131 (S80).

The support braking apparatus and method for a vehicle according to the embodiment of the present disclosure can enlarge and select the braking control target in consideration of the situations in which the braking is required while the vehicle is driving and clarify the specific braking target that the driver targets on the driving route among the plurality of braking targets. In addition, even when the braking is interrupted by the driver, the braking force may be maintained and the risk of accident may be reduced.

Those skilled in the art will appreciate that since various modifications and alterations may be made without departing from the spirit or essential feature of the present disclosure, the above-mentioned embodiments are not restrictive but are exemplary in all aspects. It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. A support braking method for a vehicle, comprising:
   selecting a braking target, of which braking amount matches an original braking amount input from a driver, among braking target candidates, detected by a camera and/or a radar, when the original braking amount is input; and
   performing automatic braking to stop a subject vehicle within a braking range for the selected braking target.

2. The support braking method for a vehicle of claim 1, wherein the selecting of the braking target includes:
   measuring a first braking amount based on signals input from an acceleration sensor and a wheel sensor;
   detecting the braking target candidates on a driving route;
   calculating a second braking amount for each of the braking target candidates so that the subject vehicle is stopped within the braking range based on a distance and a relative speed between each of the braking target candidates and the subject vehicle; and
   matching the first braking amount with the second braking amount for each of the braking target candidates to select the braking target.

3. The support braking method for a vehicle of claim 2, wherein the performing of the automatic control includes applying the first braking amount to brake the subject vehicle if a braking control by the driver is maintained.

4. The support braking method for a vehicle of claim 2, wherein the performing of the automatic control includes applying the second braking amount to brake the subject vehicle within the braking range for the selected braking target if the braking control by the driver is not maintained.

5. The support braking method for a vehicle of claim 4, wherein the performing of the automatic control further includes releasing the automatic control if the braking control by the driver is operated again.

6. A support braking apparatus for a vehicle, configured to:
   measure a first braking amount, performed by a driver, based on signals input from an acceleration sensor and a wheel sensor;
   detect braking target candidates by a camera and/or a radar;
   calculate second braking amounts corresponding to each of the braking target candidates, capable of stopping a subject vehicle within a braking range, and to select a braking target, of which second braking amount matches the first braking amount performed by the driver, among the braking target candidates detected by the camera and/or the radar; and
   perform automatic braking to stop the subject vehicle within the braking range for the selected braking target.

7. The support braking apparatus for the vehicle of claim 6, wherein the apparatus is further configured to divide an intersection or a stop signal as a first braking target candidate, a case in which braking is required according to a lane change or road surface marking as second braking target candidate, obstacles on a driving route as a third braking target candidate, and obstacles on a side of the driving route as a fourth braking target candidate and detects the first, second, third, and fourth braking target candidates.

8. The support braking apparatus for the vehicle of claim 6, wherein the apparatus is further configured to:
    calculate a second braking amount so that the vehicle is stopped within the braking range for each of the braking target candidates based on a distance and a relative speed between each of the braking target candidates and the subject vehicle; and
    match the first braking amount with the second braking amount for each of the braking target candidates to compare the first braking amount with the second braking amount.

9. The support braking apparatus for a vehicle of claim 6, wherein the apparatus is further configured to apply the first braking amount to brake the subject vehicle if a braking control by the driver is maintained.

10. The support braking apparatus for a vehicle of claim 6, wherein the apparatus is further configured to apply the second braking amount to the selected braking target to perform an automatic control to brake the subject vehicle within the braking range for the selected braking target if the braking control by the driver is not maintained.

11. The support braking apparatus for a vehicle of claim 10, wherein the apparatus is further configured to release the automatic control if the braking control by the driver is operated again.

* * * * *